May 28, 1957     H. BRANDENBERGER     2,794,105
ELECTRONIC THERMOSTAT

Filed Dec. 3, 1952     2 Sheets-Sheet 1

INVENTOR
Helmut Brandenberger
BY *Edward T. Connors*
ATTORNEY

INVENTOR.
Helmut Brandenberger

United States Patent Office 2,794,105
Patented May 28, 1957

2,794,105
ELECTRONIC THERMOSTAT

Helmut Brandenberger, Neuchatel, Switzerland, assignor to Ebauches S. A., Neuchatel, Switzerland Application December 3, 1952, Serial No. 323,819
Claims priority, application Switzerland March 4, 1952
4 Claims. (Cl. 219—20)

My invention relates to an electronic thermostat adapted to keep substantially constant the temperature of an enclosure.

This apparatus has been designed for maintaining at a constant temperature the resonators of electrical generators. It can be used every time that it is necessary to maintain an enclosure at a prescribed temperature which is greater than the ambient temperature.

In the several thermostate systems known there are generally the three following basic elements:

1. Measuring element for the temperature: (a) by the difference in the dilatation of two bodies (thermometers, bimetal, etc.); (b) by the difference in the variation of the conductivity of two bodies (resistance thermometer, electrical bridge); (c) thermo-electricity.
2. Control element for the heat power (contact, relay, thyratron, vacuum tube, etc.).
3. Heating element.

The known systems operate generally by switching on and off the heating power (system "all" or "nothing"). The temperature varies between two limits (temperature of switching on and temperature of switching off). It is generally necessary to reduce this variation by means of suitable devices, as thermic filters for instance (great mass, strong insulation), which involve several drawbacks such as a strong thermic inertia.

My invention aims at remedying these drawbacks in providing a thermostate which produces a permanent heating (without interruptions) with a variable power, this power being a function of the difference between the temperature of the enclosure and the prescribed temperature.

The electronic thermostat according to the invention is of the above-mentioned type, i. e. it comprises a measuring element for the temperature, a control element for the heating power and a heating element. It is characterized in that the measuring element, formed by a Wheatstone bridge, is fed with a substantially constant voltage by a limiter-amplifier included in the control element, the voltage applied to the heating element being proportional to the output voltage of the bridge, which is itself controlled by the temperature of the enclosure, so that the heating obtained is permanent but has a variable power.

An embodiment of the invention will now be further described by way of example with reference to the accompanying drawing, in which.

Figure 1:
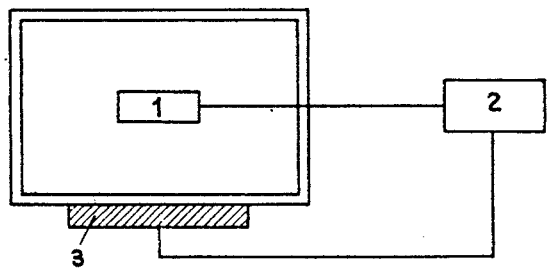
Fig. 1 shows schematically the three basic elements of the thermostat.
Figure 2:
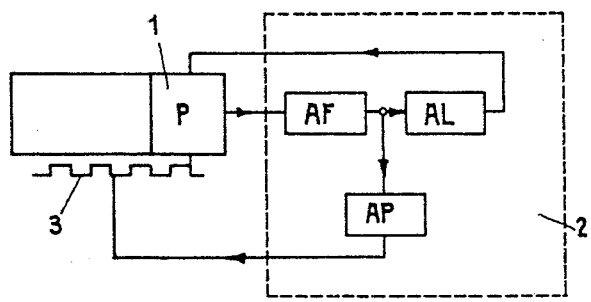
Figs. 2 and 3 show more in detail the different parts of the thermostat.
Figure 3:
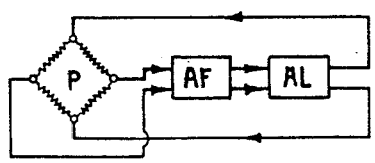

The thermostat described hereinafter comprises the three following basic elements:

1. Measuring element: Wheatstone bridge P.
2. Control element: filter-amplifier AF,
   limiter-amplifier AL,
   power-amplifier AP.
3. Heating element: heating body.

The bridge P is formed by resistances some of which are independent of the temperature and the others are dependent thereon; these resistances are incorporated in the walls of the enclosure. The bridge input is subjected to a constant alternating voltage and its output is connected to the filter-amplifier AF.

The limiter-amplifier AL supplies the bridge P with a substantially constant voltage.

The voltage going out of the filter-amplifier AF is further introduced into the power-amplifier AP which feeds the heating body 3. The latter consists of resistant wires incorporated in the enclosure walls; it is in tight thermic contact with the bridge P.

The electronic thermostat just described operates as follows:

The bridge P, fed with a constant voltage, gives at its output a voltage which depends on the temperature prevailing in the enclosure.

When the enclosure is at the prescribed temperature (balance temperature), the output voltage of the bridge is zero. When the temperature is departing from this value, a voltage is originating at the output of the bridge, which is a function of this temperature variation. When the temperature is rising and passes through the balance point, the alternating output voltage becomes zero and changes its phase by 180°.

When the input and the output of the bridge P are connected to each other through the intermediary of an amplifier, an oscillation takes place every time that the temperature of the enclosure is less than the prescribed temperature. The device formed by the bridge and the amplifier acts as an oscillator.

When the temperature reaches the prescribed value, the bridge P is in a balance and the oscillation is stopped. If the temperature is further rising, an oscillation is no longer possible, because the phase condition is not fulfilled (reverse feed-back).

The frequency of this oscillation is determined by the filter-amplifier AF; on the other hand, the amplitude is determined by the limiter-amplifier AL.

One of the features of this system resides in the use of a limiter-amplifier which feeds the bridge with a substantially constant voltage and permits to obtain that the output voltage of the bridge be rigorously controlled by the temperature of the enclosure.

This feature permits applying to the heating body 3 a voltage which is directly proportional to the output voltage of the bridge. In this manner the heating body is given a variable power which is a function of the temperature in the enclosure. The heating is thus permanent with a variable power.

The working frequency can be chosen at will; nevertheless for practical reasons (efficiency of the transformators, etc.), it is advisable to choose this frequency in the audio-frequency band.

The electronic thermostat described above has the following advantages:

(a) very high precision;
(b) no temperature variations produced by switching on and off the heating power;
(c) very low thermic inertia;
(d) the temperature reaches the prescribed value by monotonic increasing;
(e) easy and precise adjustment of the working temperature by varying the resistances of the bridge;
(f) the heating power only depends on the temperature of the bridge, owing to the substantially constant feeding voltage (coming from the limiter-amplifier) for the latter;

(g) this thermostat is entirely electronic and comprises neither contacts, nor switches, nor relays, nor any other electro-mechanical means requiring keeping in repair and cleaning.

The enclosure 4 in which the temperature is to be kept constant is heated by a heating resistor 3. A Wheatstone bridge P located within the enclosure has two constant resistors 5 in opposite arms and two variable resistors 6 in the remaining arms. The output terminals of the bridge are connected to the control grid of a vacuum tube 7. This tube has a cathode resistor 8 bridged by a condenser 9. The anode of tube 7 is connected to a battery 10 through an oscillatory circuit 11, elements 7 to 11 constituting a tuned amplifier of conventional type such as shown on page 435, Fig. 67a of "Radio Engineers Handbook" by F. E. Terman, McGraw-Hill Book Company, Inc., New York and London 1943. The anode of tube 7 is coupled in a well known manner to the grid of a vacuum power tube 12 through a condenser 13 and to the control grid of a vacuum tube 14 through a condenser 15. A grid resistor 16 is connected to the grid of tube 14 and an output transformer 17 is connected to the anode of tube 17, elements 14, 15, 16 and 17 constituting an amplitude limiting amplifier of well-known type for any voltage appearing on the grid of tube 14. An amplitude limiting circuit of this type has been described in "Vacuum Tube Circuits"; John Wiley and Sons Inc. 1948, page 482, Fig. 12. The secondary of transformer 17 is connected to the input of the bridge P by conductors 18 and 19.

The tube 12 has a grid leak resistor 22 as usual, a cathode resistor 20 and a bridging condenser 21. The power output of tube 12 is transmitted to the heating resistor 3 through a transformer 23. Elements 12 and 20 to 23 constitute a power amplifier of conventional type as disclosed for instance on page 377, Fig. 16b of "Radio Engineers Handbook" mentioned above.

Figure 4:
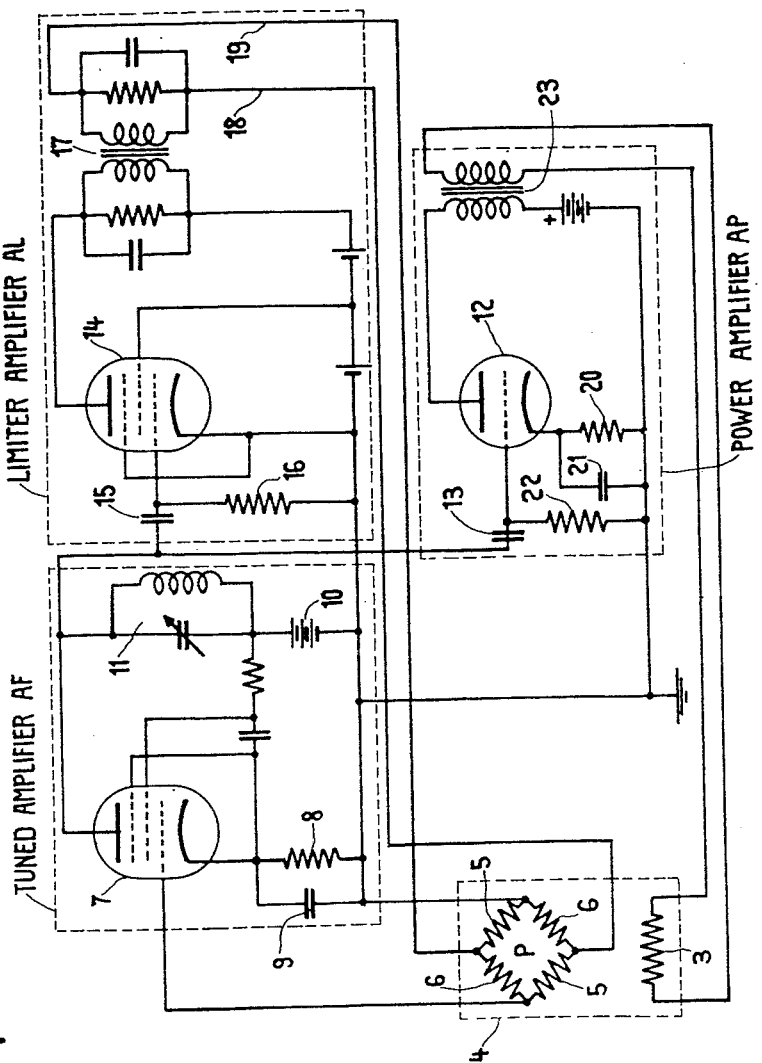
Fig. 4 shows the circuit diagram of a typical embodiment of the thermostat.

When the system shown in Fig. 4 is set to operation, the temperature in the enclosure 4 will be equal to the ambient temperature under which conditions the Wheatstone bridge P is completely out of balance and oscillations are set up in the amplifier constituted by the tubes 7 and 14, the frequency of such oscillations being determined by the oscillatory circuit 11 of the tuned amplifier. In spite of the fact that the bridge P is completely out of balance the output voltage of the amplifier 14 is limited in a well known manner to a constant amount. Therefore the input voltage applied to the Wheatstone bridge P through the transformer 17 is substantially constant independent of the bridge unbalance. On the other hand the output voltage of the bridge P depends on the amount of bridge unbalance. This output voltage is applied to the grid of the tube 7 and is amplified and transmitted to the grid of the tube 12 through the condenser 13. The voltage applied to the grid of tube 12 is amplified so that a voltage substantially proportional to the output voltage of the bridge P is applied to the heating resistor 3. In the beginning of the heating period, that is, as long as the bridge is cold, the bridge unbalance and consequently the heating power will be a maximum. The enclosure is then heated by the power dissipated by the heating resistor 3 and as the enclosure becomes warmer, the bridge is heated and the bridge unbalance becomes smaller. But whereas the output voltage of the bridge becomes smaller, the bridge input voltage remains constant due to the amplitude limiting amplifier 14 or AL respectively. The bridge unbalance and the power dissipation of the heating resistor 3 further decreases until a balance is reached between the heat dissipation of resistor 3 and the heat losses from the enclosure to the ambient atmosphere. It is desirable to design the bridge and the oscillator amplifier 7 and 14 in such a manner that the amplifying reserves of the amplifier are sufficient to keep the input voltage of the bridge constant, that is, within the range of operation of the limiter amplifier for normal conditions. Experiments have shown that under these circumstances absolutely stable conditions may be obtained whereby there are no variations of the heating power. This results in that there are no changes in the temperature of the enclosure 4 and the heat dissipated by the resistor 3 exactly equals the heat dissipated by the enclosure.

While I have described and illustrated one embodiment of my invention, I do not wish to unnecessarily limit the scope of my invention, but reserve the right to make such modifications and rearrangements of the several parts as may come within the purview of the accompanying claims.

What I claim is:

1. In an electronic temperature control system for substantially constantly maintaining the temperature of an enclosure, a heating resistor for the enclosure, a Wheatstone bridge, a temperature sensitive resistor exposed to the temperature in the enclosure in at least one arm of the Wheatstone bridge, a first tuned amplifier having its input connected to the output of the Wheatstone bridge, a second amplifier including amplitude limiting means having its input connected to the output of the tuned amplifier and having its output connected to the input of the Wheatstone bridge for providing oscillations in the first and second amplifier and in the Wheatstone bridge below or at a given temperature in the enclosure, and a power amplifier having its input connected to the output of the first amplifier and its output connected to the heating resistor.

2. In an electronic temperature control system for maintaining the temperature of an enclosure substantially constant, heating resistor means for heating the enclosure, a feed-back oscillating circuit including an amplifying circuit and a balanced feed-back circuit having its input connected to the output of the said amplifying circuit and its output connected to the input of the said amplifying circuit, temperature responsive means separate from the said heating resistor means connected in the feed-back circuit, the said temperature responsive means exposed to and controlled by the temperature in the said enclosure for controlling the feed-back ratio, the said amplifying circuit being responsive to unbalance output voltages from the said feed-back circuit of proper polarity for supplying to the feed-back circuit an input voltage, amplitude limiting means in the said amplifying circuit for maintaining the input voltage to the feed-back circuit substantially constant and independent of the input voltage of the amplifying circuit and another amplifying circuit having its input connected to the output of the said feed-back circuit and its output connected to the said heating resistor means for supplying to the heating resistor means a voltage substantially proportional to the output voltage of the said feed-back circuit.

3. A thermostat system comprising resistor means connected to form a first pair of conjugate arms in a balancing bridge, second resistor means connected to form a second pair of conjugate arms in said bridge, at least one resistor means in one pair of conjugate arms having a resistance respectively lower and higher than the resistor means in the second pair of conjugate arms at temperatures respectively lower and higher than a predetermined balance temperature, the said one resistor means in the said one pair of conjugate arms having a temperature coefficient of resistivity larger than that of the resistor means in the second pair of conjugate arms, a tuned amplifier circuit having its input connected to the output of said bridge and its output connected to the input of said bridge, said tuned amplifier circuit being responsive to bridge unbalance voltages of proper polarity for supplying to the bridge an oscillating current necessary for just maintaining the system in oscillation at the predetermined temperature, amplitude limiting means in the said amplifier circuit for maintaining the oscillating current supplied to the bridge substantially constant and independent of the input voltage of the amplifier circuit, a heating resistor in the said enclosure and another amplifier circuit having its input connected to the output of the said bridge and its output connected to the said heating resistor for supplying to the heating resistor a current substantially proportional to the output voltage of the bridge.

4. A thermostat system comprising resistor means connected to form the arms of a balancing bridge, the resistor means in at least one arm of the bridge having a resistance respectively lower and higher than the resistor means in the other arms of the bridge at temperatures respectively lower and higher than a predetermined balance temperature, the resistor means in the said one arm of the bridge having a temperature coefficient of resistivity larger than that of the resistor means in the other bridge arms, an amplifier circuit having its input connected to the output of said bridge and its output connected to the input of said bridge, said amplifier circuit being responsive to bridge unbalance voltages of proper polarity for supplying to the bridge an oscillating current necessary for just maintaining the system in oscillation at the predetermined temperature, amplitude limiting means in the said amplifier circuit for maintaining the oscillating current supplied to the bridge substantially constant and independent of the input voltage of the amplifier circuit, a heating resistor in the said enclosure and another amplifier circuit having its input connected to the output of the said bridge and its output connected to the said heating resistor for supplying to the heating resistor a current substantially proportional to the output voltage of the bridge.

References Cited in the file of this patent

UNITED STATES PATENTS

| | | |
|---|---|---|
| 2,086,966 | Shrader | July 13, 1937 |
| 2,093,745 | Westell | Sept. 21, 1937 |
| 2,189,462 | Donle et al. | Feb. 6, 1940 |
| 2,505,565 | Michel et al. | Apr. 25, 1950 |
| 2,616,020 | Fay et al. | Oct. 28, 1952 |
| 2,632,086 | Hagen | Mar. 17, 1953 |

OTHER REFERENCES

L. B. Arguimbau: Vacuum Tube Circuits; John Wiley and Sons, Inc., 1948; pp. 478, 481, 536–540.